US009566678B2

(12) United States Patent
Garcia Calderón et al.

(10) Patent No.: US 9,566,678 B2
(45) Date of Patent: Feb. 14, 2017

(54) SYSTEM OF VARIABLE HYDROSTATIC GUIDEWAY FOR VERTICAL LATHES AND A VERTICAL LATHE THAT INCLUDES SAID GUIDEWAY

(75) Inventors: Emilio Garcia Calderón, Asteasu (ES); Elisabete Bengoechea Ubarrechena, Asteasu (ES)

(73) Assignee: BOST MACHINE TOOLS COMPANY, S.A., Asteasu (Guipuzcoa) (ES)

( * ) Notice: Subject to any disclaimer, the term of this patent is extended or adjusted under 35 U.S.C. 154(b) by 866 days.

(21) Appl. No.: 13/885,074

(22) PCT Filed: Nov. 15, 2010

(86) PCT No.: PCT/ES2010/070730
§ 371 (c)(1),
(2), (4) Date: Aug. 23, 2013

(87) PCT Pub. No.: WO2012/066152
PCT Pub. Date: May 24, 2012

(65) Prior Publication Data
US 2013/0319192 A1    Dec. 5, 2013

(51) Int. Cl.
*B23Q 1/38* (2006.01)
*B23Q 1/52* (2006.01)
*F16C 32/06* (2006.01)

(52) U.S. Cl.
CPC .................. *B23Q 1/38* (2013.01); *B23Q 1/522* (2013.01); *F16C 32/064* (2013.01); *Y10T 82/2511* (2015.01)

(58) Field of Classification Search
CPC .......... B23Q 1/38; B23Q 1/522; F16C 29/025; F16C 32/064
See application file for complete search history.

(56) References Cited

U.S. PATENT DOCUMENTS 2,885,915 A * 5/1959 Schurger .................. B23Q 1/38
269/20
3,137,530 A * 6/1964 Kohler ..................... B23Q 1/38
384/12

(Continued)

FOREIGN PATENT DOCUMENTS

DE    102009020384 A1    11/2010
EP      2067569 A1       6/2009

OTHER PUBLICATIONS

International Search Report for corresponding application PCT/ES2010/070730 filed Nov. 15, 2010; Mail date Aug. 29, 2011.

*Primary Examiner* — Sunil K Singh
*Assistant Examiner* — Sara Addisu
(74) *Attorney, Agent, or Firm* — Cantor Colburn LLP

(57) ABSTRACT

A variable hydrostatic track system for vertical lathes includes
  a plurality of sectors arranged between the periphery and the central opening of an annular base. Each sector includes an upper housing with a hydraulic fluid outlet such that when the injected hydraulic fluid overflows from the housings, it forms a film between the rotating chuck and the sectors. The track system further includes
  a positioning mechanism having a plurality of hydraulic cylinders fixed on the annular base in a radial direction between the central opening and the sectors. The rod of each hydraulic cylinder is coupled to a piston and to one of the sectors.
Each sector is guided in a radial guidance element such that, due to the action of the hydraulic cylinder, the sector is movable between an inner radial position and an outer radial position.

15 Claims, 12 Drawing Sheets

(56) References Cited

U.S. PATENT DOCUMENTS

| | | | | |
|---|---|---|---|---|
| 3,772,961 A | * | 11/1973 | Siebert | B23Q 1/38 |
| | | | | 384/100 |
| 4,380,939 A | * | 4/1983 | Gardner | B23Q 1/0027 |
| | | | | 198/345.2 |
| 4,611,797 A | * | 9/1986 | Cetnarowski | B23Q 1/52 |
| | | | | 269/57 |
| 4,656,951 A | * | 4/1987 | Kimura | B23Q 1/38 |
| | | | | 108/20 |

* cited by examiner

A-A

001
SYSTEM OF VARIABLE HYDROSTATIC GUIDEWAY FOR VERTICAL LATHES AND A VERTICAL LATHE THAT INCLUDES SAID GUIDEWAY

TECHNICAL FIELD OF THE INVENTION

The present invention is comprised in the technical field of the machine tools and, particularly in the sector of vertical lathes which comprise hydrostatic tracks as a bearing.

BACKGROUND OF THE INVENTION

Vertical lathes are tools which are generally designed for the machining parts which, due to their dimensions and weight, would make the fixing thereof in a horizontal lathe difficult. They usually comprise a vertical shaft and a rotating chuck. The rotating chuck is assembled on a base and between both there are arranged bearings allowing the rotation between the rotating chuck and the base. The part to be machined is secured on the base whereas the machining tool or tools (lathe, milling tools, etc.) are assembled in one or several columns. A bearing is arranged between the base and the rotating chuck which enables the rotation of the chuck with respect to the base.

The use of hydrostatic tracks as bearings is known, which hydrostatic tracks are made up of a series of arched elements in the form of circle segments arranged such that they form a circumference, and which comprise housings into which there is injected pressurised hydraulic oil filling the housings. If the pressure of the hydraulic oil is maintained, such hydraulic oil overflows and lifts the rotating chuck with respect to the base. A film of oil acting as a sliding track is thus formed between both elements. Given that the rotating chuck must have the possibility of rotating at a determined speed for the machining, and given that the machining force of the tool on the part must be supported by the rotating chuck, the latter is subjected to a highly considerable torque generated by the applying of force of the tool at a distance with respect to the rotation shaft of the chuck. This torque varies considerably depending on the dimensions of the part to be machined. Therefore, for a determined size of the part to be machined, there is a suitable chuck diameter and a suitable hydrostatic track, essentially the diameter of the hydrostatic track is fixed for a determined size of the part. This results in the drawback that a hydrostatic track of a different size and, therefore, a different vertical lathe or machine are needed for each size of the part to be machined, which involves a serious limitation in relation to the versatility of use, and, therefore, the cost of vertical lathes equipped with such hydrostatic tracks.

DESCRIPTION OF THE INVENTION

The object of the present invention is to overcome the drawbacks of the state of the art detailed above by means of a new variable hydrostatic track system for vertical lathes and a vertical lathe comprising said track.

According to the invention, the hydrostatic track system comprises an annular base capable of being arranged between a support base and a securing rotating chuck of a vertical lathe; a central opening in the annular base surrounding a rotation shaft for the rotating chuck; a plurality of sectors capable of forming a circle and projecting vertically between the periphery and the central opening of the annular base, each sector, which can be an arched body, made of bronze for example, comprising an upwardly open upper housing; at least one hydraulic fluid outlet arranged at the bottom of each housing and which allows injecting hydraulic fluid into the corresponding housing such that, when the injected hydraulic fluid overflows from the housings, the hydraulic fluid pushes the rotating chuck upwards forming a film of hydraulic fluid between the rotating chuck and the sectors; the system being characterised in that it comprises a positioning mechanism capable of positioning the sectors (4) at least in an inner radial position in which at least one part of the sectors is arranged in a circumference of a minimum diameter and in an outer radial position in which at least one part of the sectors is arranged in a circumference of a maximum diameter.

Unlike conventional hydrostatic track systems, the system according to the present invention allows developing a configuration of the hydrostatic track with the least possible surface of friction, which represents a considerable increase in the maximum revolutions of the securing rotating chuck and, thus, of the part to be machined secured to the chuck, without limitations, with an installed cooling power which is perfectly acceptable under extreme work conditions.

The positioning mechanism is preferably designed to individually position each sector in one of said positions. Likewise, the positioning mechanism is preferably designed to furthermore position at least one part of the sectors in at least one intermediate position between said inner radial position and said outer radial position.

In a preferred embodiment, the positioning mechanism comprises a plurality of double-acting hydraulic cylinders fixed on the annular base in a radial direction between the central opening and the sectors, each hydraulic cylinder comprising a barrel cylinder, a bottom chamber, a head chamber and a rod coupled at an end to a piston moving linearly in the barrel cylinder, and at another end to one of the sectors. In this embodiment, each sector which is coupled to a hydraulic cylinder is guided in at least one radial guidance element such that, due to the action of the hydraulic cylinder, the sector is movable between the inner radial position in which the hydraulic cylinder is locked in its retracted position and the outer radial position in which the hydraulic cylinder is locked in its extended position.

At least part and, preferably, each of the hydraulic cylinders can be driven independently of the others.

The number of hydraulic cylinders can be odd or even. When the number of hydraulic cylinders is even, they comprise at least one pair of hydraulic cylinders fixed respectively in radially opposite directions in a diagonal line of the annular base which are coupled to respective diagonally opposite sectors. The number of hydraulic cylinders can thus be 2, 4, 6, 8, 10, 12 etc. In turn, when the number of hydraulic cylinders is odd, the radial ends thereof form a regular polygon of at least three points.

The radial guidance elements can be respective wedge-shaped blocks respectively projecting from the annular base between two adjacent sectors, such that there is an even number of such blocks when there is an even number of hydraulic cylinders or an odd number when there is an odd number of hydraulic cylinders.

In an embodiment of the invention, each hydraulic cylinder can be furthermore locked in its retracted position and in its extended position, in at least one intermediate position between said retracted position and said extended position. It is thus possible to not only configure at least three defined hydrostatic track diameters, namely a maximum diameter, a minimum diameter and an intermediate diameter, such that the resisting moments can be increased and the pre-securing force can be reduced according to the different diameters of the parts to be machined, but other intermediate alternatives with the intermediate diameter and the maximum and minimum diameters are also possible, for example by alternately moving the sectors, which provides a considerable increase of the rigidity for extremely severe machining operations, without additional power losses.

In vertical lathes it is necessary to maintain the empirical relationship between the chuck diameter and the diameter of the hydrostatic track, which in the conventional vertical lathe models entails limitations of both speed and the tangential cutting force itself. The variable hydrostatic track system according to the present invention is therefore a versatile and innovative configuration of the hydrostatic track which allows concentrating at least three different conventional vertical lathe models in only one, maintaining the main features and performance of each of such conventional models. Thus, with this new system, three track diameters comprised between 2,100, 2,400 and 2,700 mm can thus be configured with a chuck diameter of 3,500 mm for example, which track diameters correspond, with an identical chuck/track ratio, to conventional machine models with chuck diameters of 3,500, 4,000 and 4,500 mm respectively. According to this example, when the system according to the present invention is integrated into a vertical lathe, it is possible to perform any type of machining in parts with diameters comprised between 300 and 5,300 mm with the maximum performance. This means that the present invention allows varying the diameter of the hydrostatic track at will, according to the diameters of the parts to be machined, corresponding to each model.

In a preferred embodiment of the hydraulic cylinders, each of them comprises an inner passage with a first end part connected to an intake connection for the hydraulic fluid which is injected into the housing of the sector and a second end part connected to the hydraulic fluid outlet in the housing of the sector to which the hydraulic cylinder is connected. In this preferred embodiment, a first end of the hydraulic cylinder can be fixed in the annular base by means of a first anchor body anchored to the annular base in the proximity of the central opening and a second end of the hydraulic cylinder, through which the rod projects, is fixed in the annular base by means of a second anchor body. The intake connection for the hydraulic fluid which is injected into the housing of the sector is, in this case, comprised in the first anchor body, whereas in the inner passage of the rod of the hydraulic cylinder there is housed an inner tube which traverses the piston and is fixedly connected at one its ends to the intake connection for the hydraulic fluid such that, when the rod is extended and retracted, the wall of the inner passage of the rod slides in the periphery of the inner tube. The inner tube has a length such that the hydraulic fluid flows into said inner passage both when the rod is in its maximum extension position and when the rod is in its maximum retraction position. The anchor bodies can be respectively provided with two side flanges capable of being screwed to the annular base. The anchor bodies can likewise be attached to one another by means of four connection bars coaxially surrounding the barrel cylinder.

The first anchor body can comprise a first conduit connecting the bottom chamber of the hydraulic cylinder with a first connection to a hydraulic circuit feeding the hydraulic cylinder whereas the second anchor body can comprise a second conduit connecting the head chamber of the hydraulic cylinder with a second connection of the hydraulic circuit. The bottom of the hydraulic circuit can be integrated in the first anchor body and the head thereof in the second anchor body. The first anchor body can comprise a through hole for housing a first pressure sensor for measuring the pressure of the hydraulic fluid in the bottom chamber of the hydraulic cylinder, and the second anchor body can in turn comprise a through hole for housing a pressure sensor for measuring the pressure of oil in the head chamber.

The configuration of these hydraulic cylinders involves an important structural simplification since outer conduits that would be necessary for feeding hydraulic fluid to the upper housing of the sectors are avoided.

The system according to the present invention can further comprise a variable preloading device of the variable hydrostatic track which comprises a central hydraulic cylinder by means of which the hydrostatic fluid can be preloaded according to the chosen configuration of the track, i.e. the position of the respective sectors.

This device allows adapting the preloading force of hydraulic fluid to each configuration of the hydrostatic track. Given that for the same horizontal cutting force applied on the part to be machined, the resulting preload is substantially lower for the larger diameter thereof, since in this case the resisting moment thereof is increased, the variable preloading device thus provides the system with a greater reliability, precision and service life, as well as a saving in energy and an increase of the rotational speed of the securing chuck in the track without modifying the characteristics of the material due to the large centrifugal forces.

The hydrostatic track system according to the present invention can, on one hand, be integrated in already existing vertical lathes. On the other hand, the present invention also includes the vertical lathes comprising a support base, a securing rotating chuck and a hydrostatic track on which the rotating chuck rotates, as well as a variable hydrostatic track system such as the one described above.

From the foregoing it is inferred that the present invention, in addition to providing other advantages which have been mentioned above in the present specification, satisfactorily overcomes the drawbacks of the state of the art.

BRIEF DESCRIPTION OF THE DRAWINGS

Aspects and embodiments of the invention are described below on the basis of schematic drawings, in which.

Figure 1:
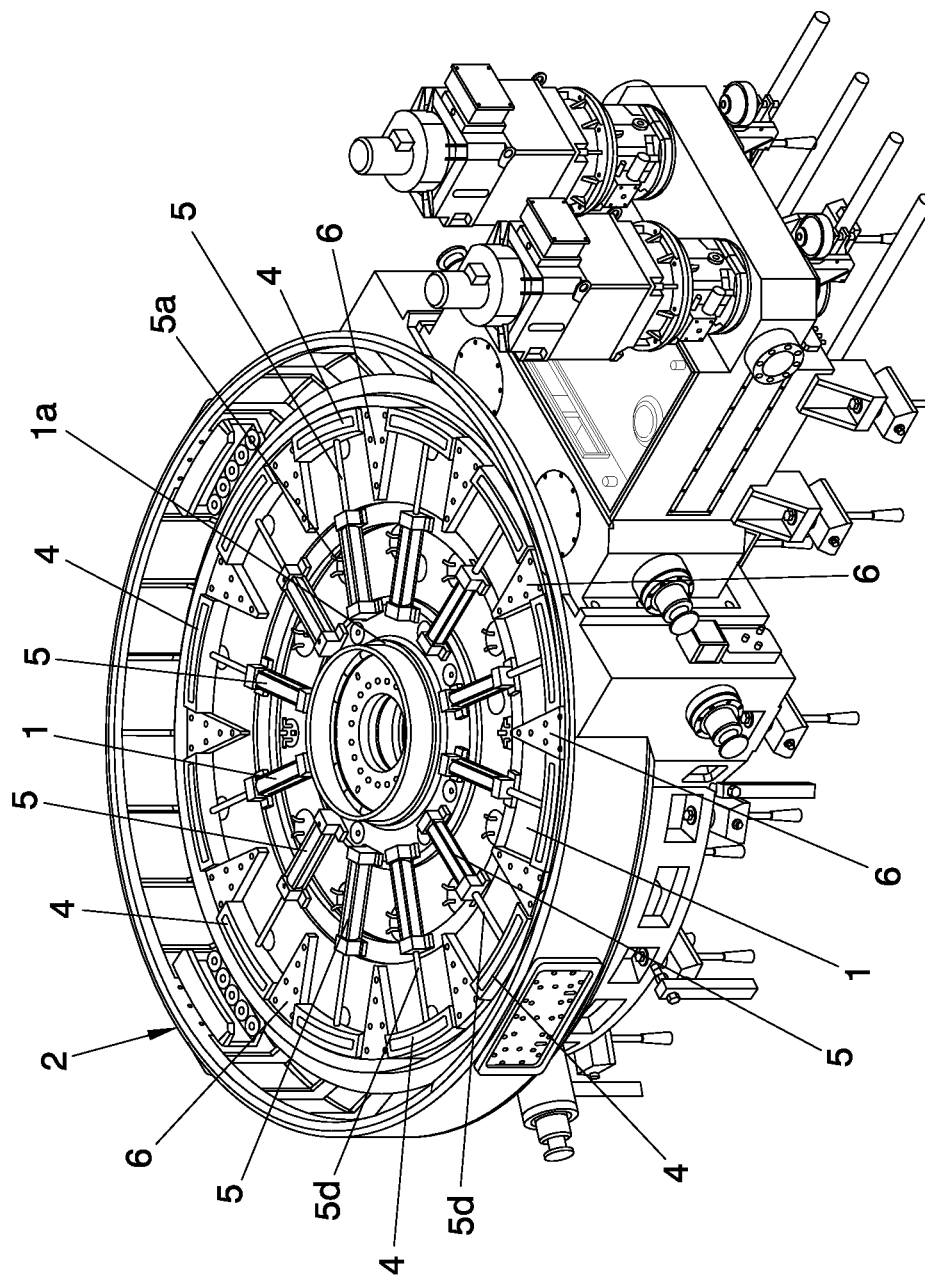
FIG. 1 is a top perspective view of the base of a vertical lathe incorporating an embodiment of the system according to the present invention, in a first maximum extension position of the variable hydrostatic track.
Figure 2:
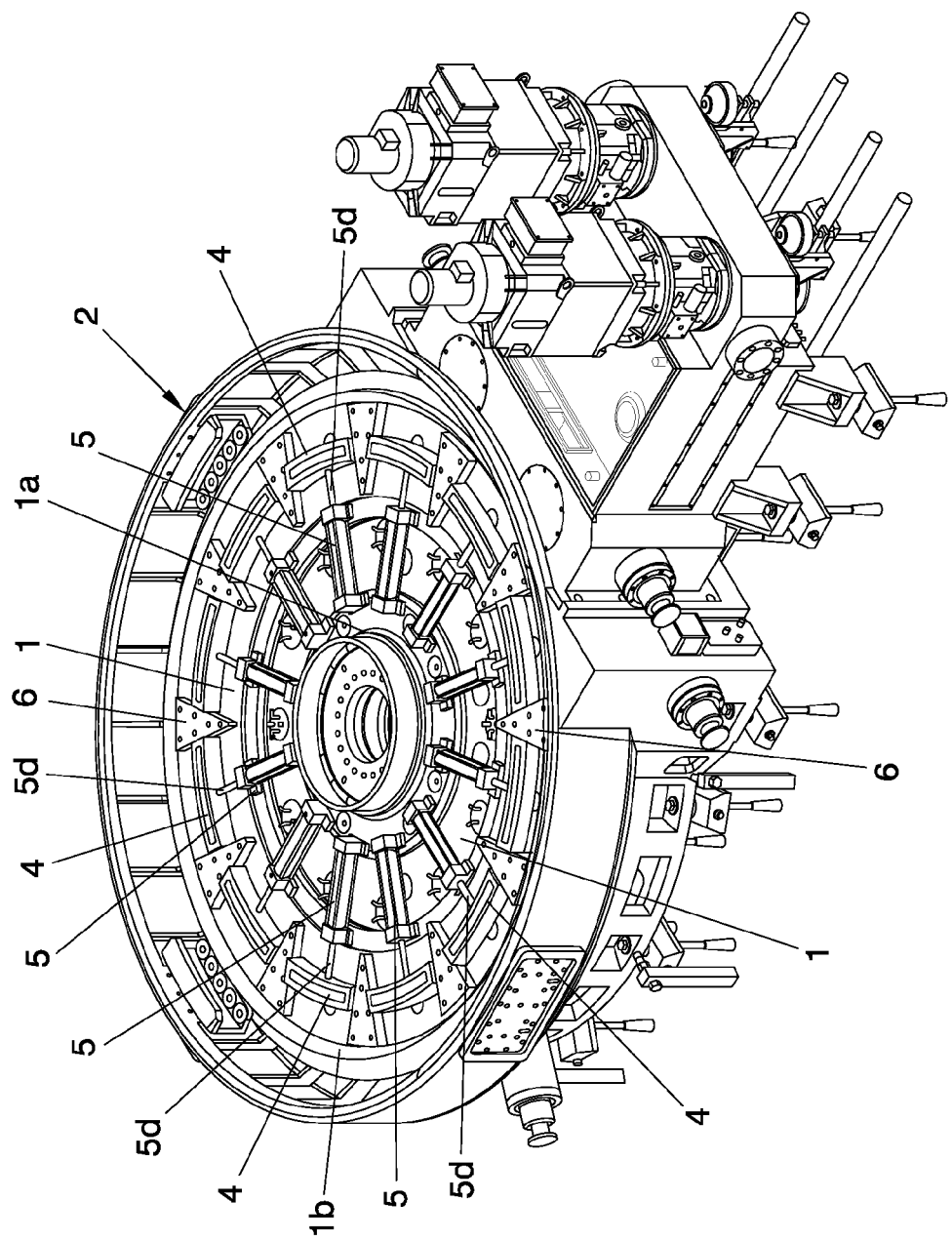
FIG. 2 is a top perspective view, corresponding to FIG. 1, in which the hydrostatic track is in a medium extension position.

In these figures there are reference numbers which identify the following elements:

1 annular base
1a central opening of the annular base
1b periphery of the annular base
2 support base
3 securing rotating chuck
3a rotation shaft of the rotating chuck
4 sector
4a upper housing
4b hydraulic fluid outlet
5 hydraulic cylinder
5a barrel cylinder
5b bottom chamber
5c head chamber
5d rod
5e inner passage
5f first end part of the inner passage
5g second end part
5h bottom of the hydraulic cylinder
5i head of the hydraulic cylinder
5j piston of the hydraulic cylinder
6 radial guidance element
7 intake connection for the hydraulic fluid
8 first anchor body
8a first conduit
8b through hole
8c, 8d side flange
9 second anchor body
9a second conduit
9b through hole
9c, 9d side flange
10 inner tube
10a ends of the inner tube
11a pressure sensor
11b pressure sensor
12 connection bar

EMBODIMENTS OF THE INVENTION

FIGS. 1 to 11 show an embodiment in which the hydrostatic track system comprises an annular base -1- arranged between a support base -2- and a securing rotating chuck -3- of a vertical lathe. The annular base -1- has a central opening -1a- which surrounds a rotation shaft -3a- for the rotating chuck -3-. Between the periphery -1b- and the central opening -1a- of the upper surface of the annular base -1- there are arranged twelve sectors -4- in the form of arched bodies made of bronze, coupled to the rods -5d- of respective double-acting hydraulic cylinders -5- fixed on the annular base in a radial direction between the central opening -1a- and the sectors -4-. Each hydraulic cylinder can be driven independently from the others, and respectively two of the hydraulic cylinders -5- are arranged diametrically opposite along respective diametric lines of the annular base -1-, such that six pairs of hydraulic cylinders are formed in which such hydraulic cylinders are in diametrically opposite positions. The sectors -4- are guided in radial guidance elements made as wedge-shaped blocks -6- respectively projecting from the annular base -1- between two adjacent sectors -4-. The blocks -6- are shorter than the sectors -4-. Each sector -4- has an upwardly open upper housing -4a- and a hydraulic fluid outlet arranged at the bottom of the housing -4a- which allows injecting hydraulic fluid -4a- such that, when the injected hydraulic fluid overflows from the housings -4a-, the hydraulic fluid pushes the rotating chuck 3- upwards (see FIG. 11), forming a film of hydraulic fluid between the rotating chuck and the sectors -4-.

Figure 3:
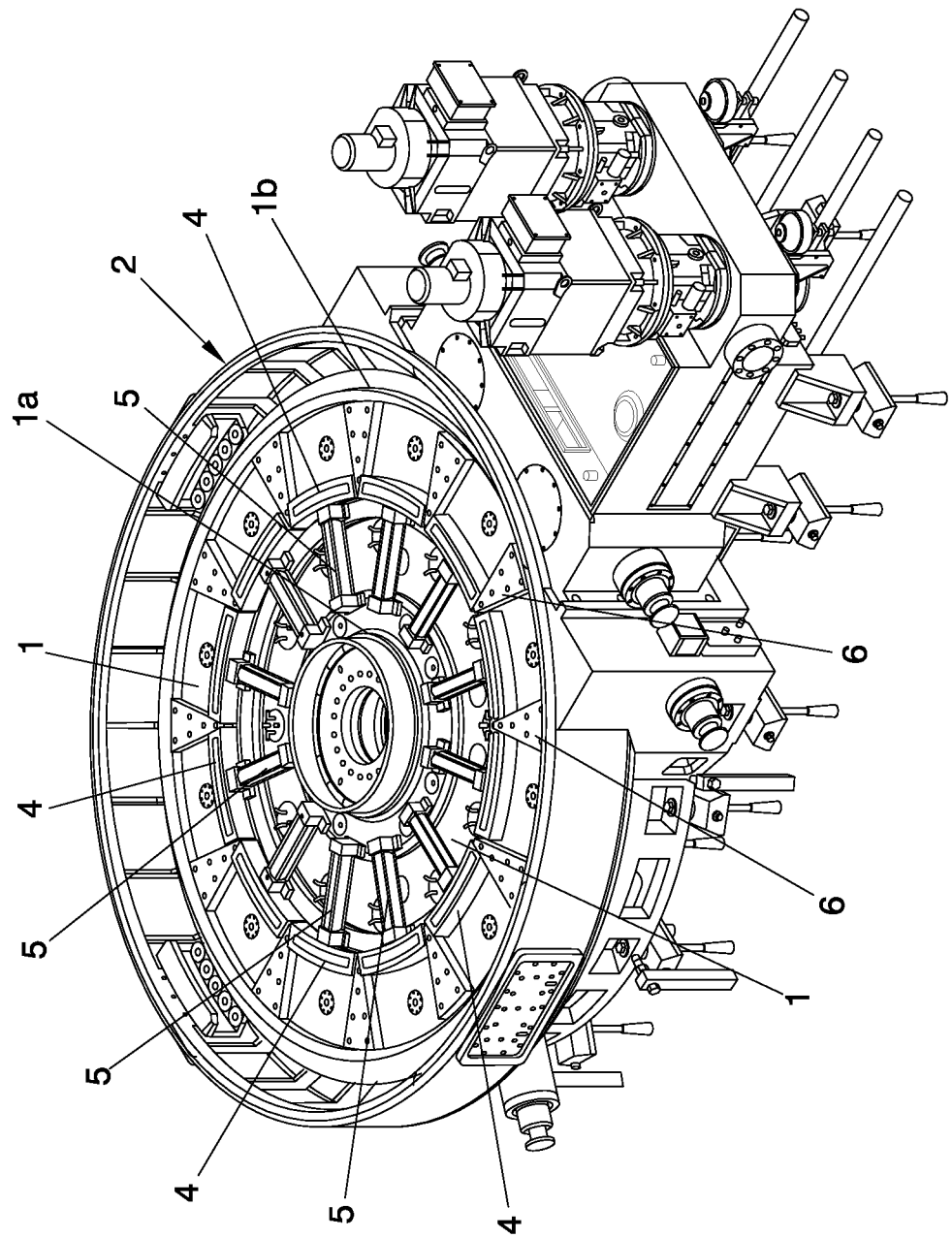
FIG. 3 is a top perspective view, also corresponding to FIG. 1, in which the hydrostatic track is in a minimum extension position.
Figure 4:
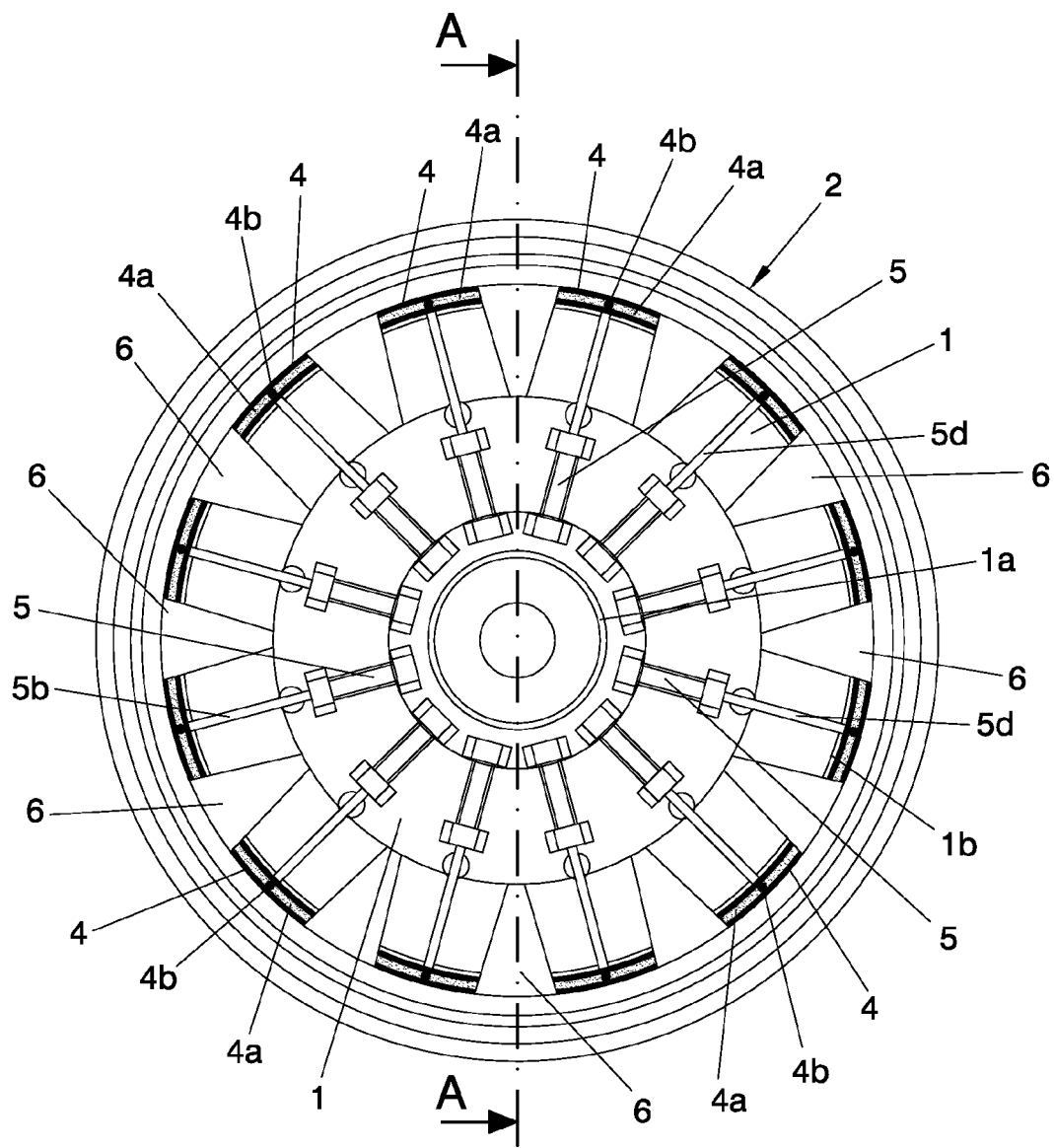
FIG. 4 is a top plan view of the base and track shown in FIG. 1.
Figure 5:
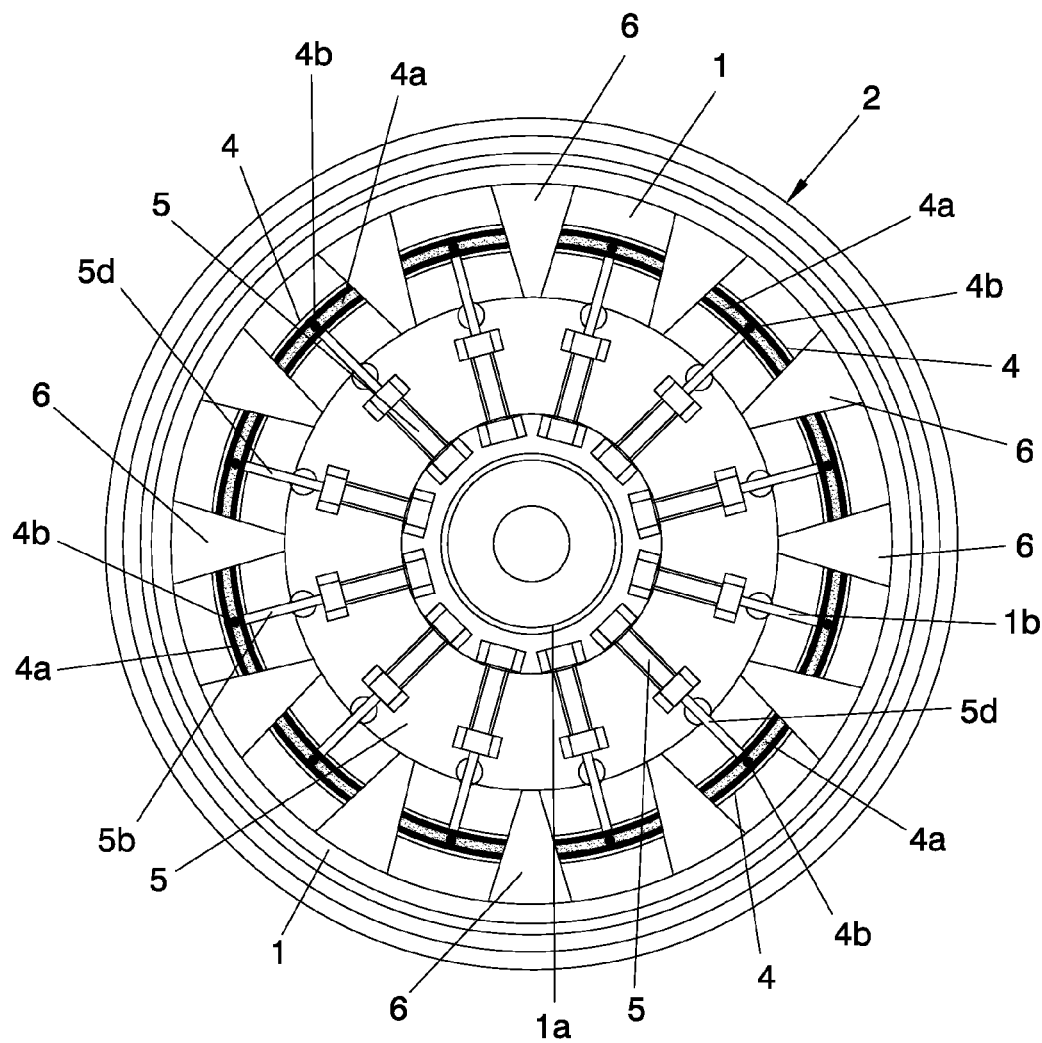
FIG. 5 is a top plan view of the base and track shown in FIG. 2.
Figure 6:
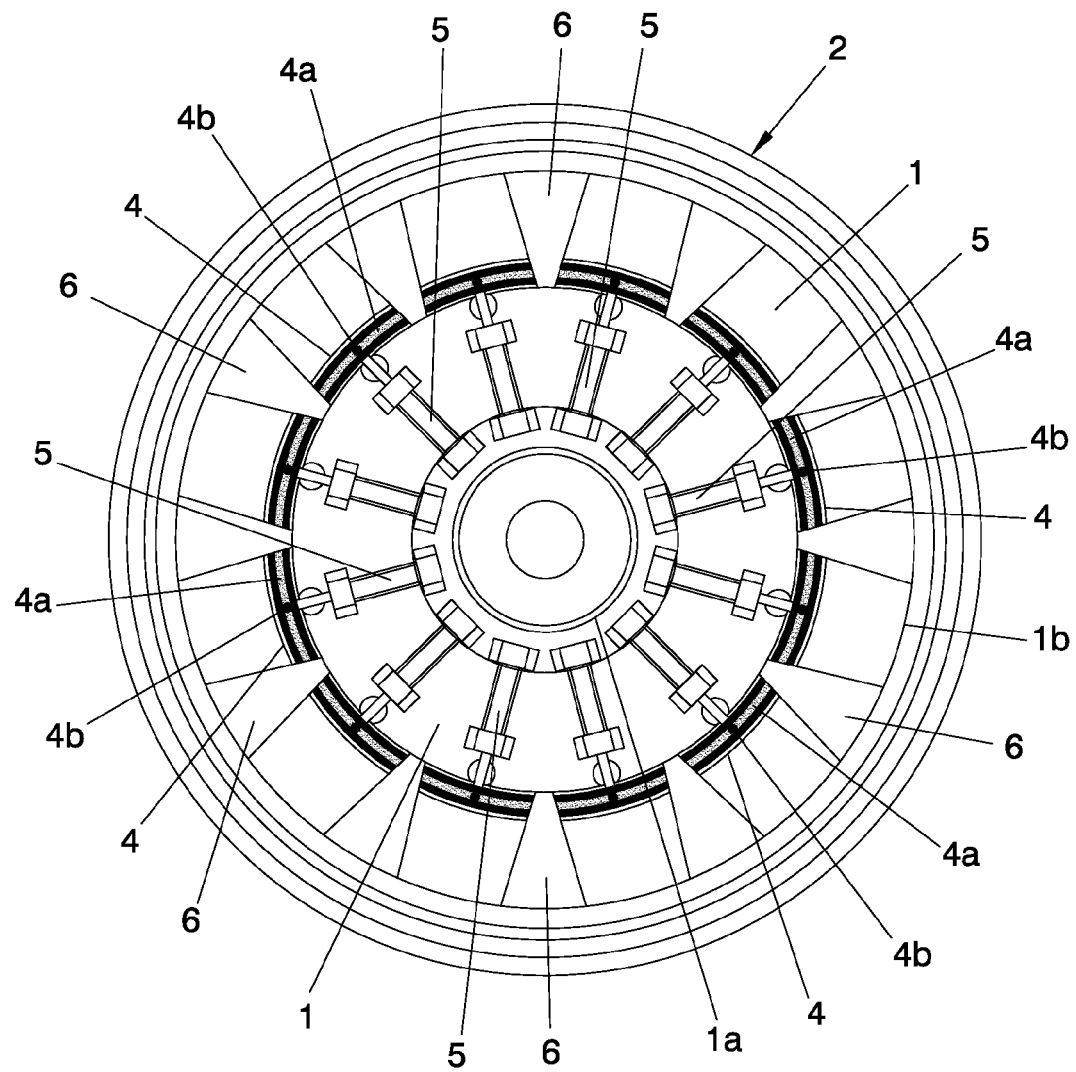
FIG. 6 is a top plan view of the base and track shown in FIG. 3.
Figure 7:
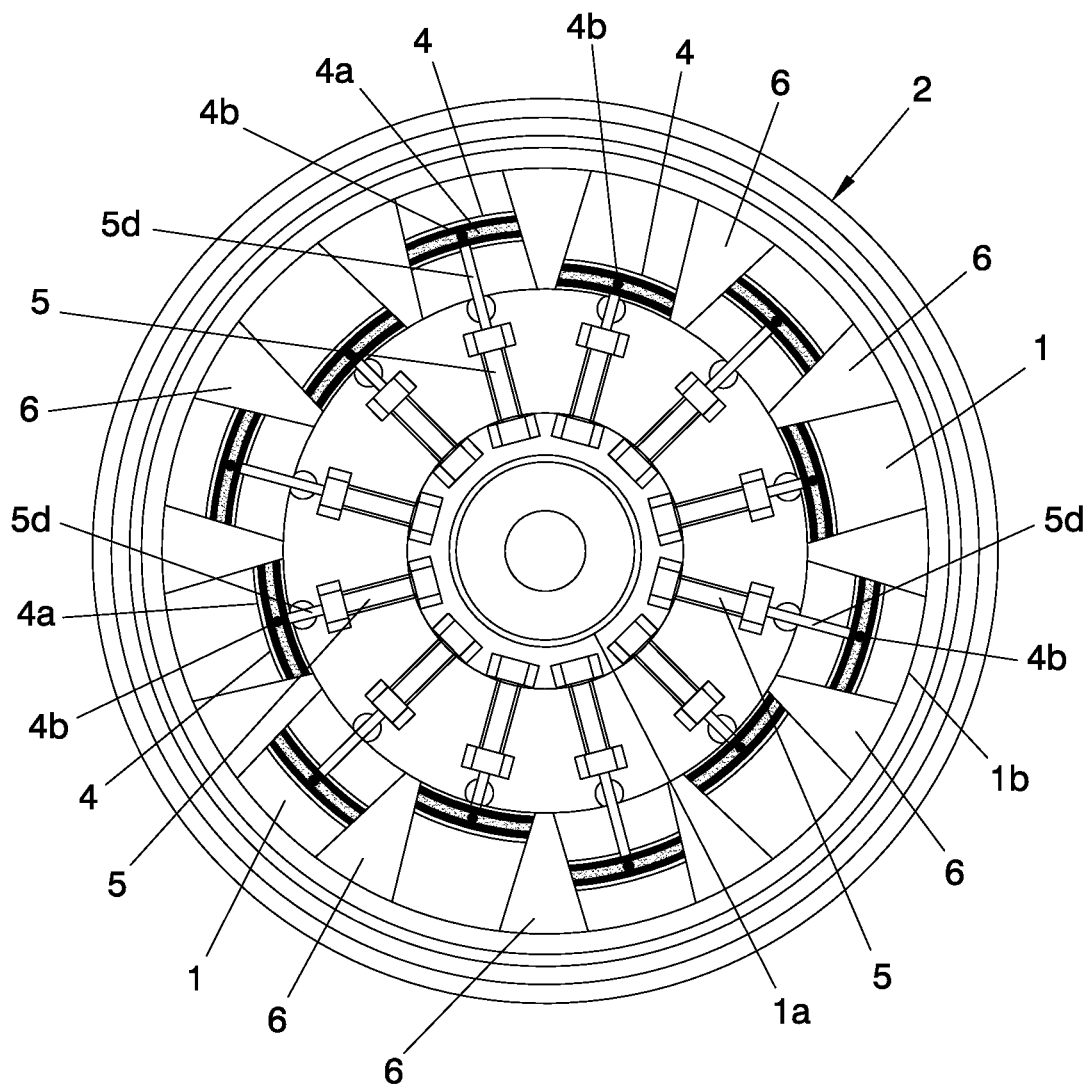
FIG. 7 is a top plan view of the base and track shown in FIGS. 1 to 7, in a position in which the hydrostatic track is formed such that the adjacent sectors are in alternating positions such that some form a circumference of a minimum diameter and others form a circumference of an intermediate diameter.
Figure 8:
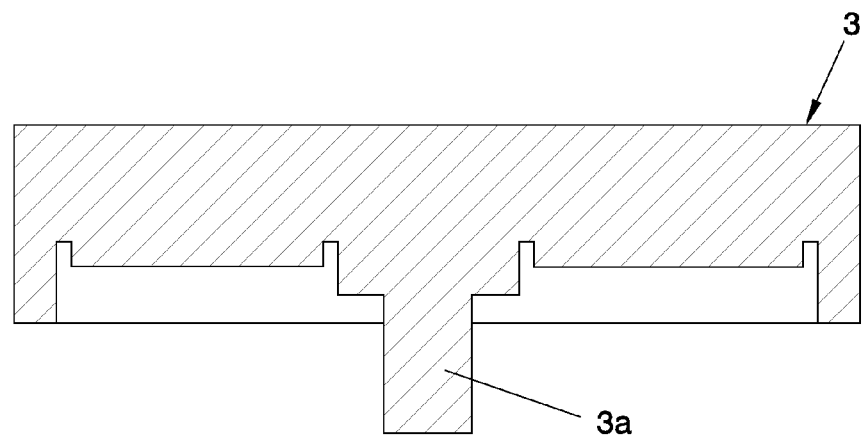
FIG. 8 is a section view of a chuck which can be coupled to the base shown in FIG. 1.
Figure 9:
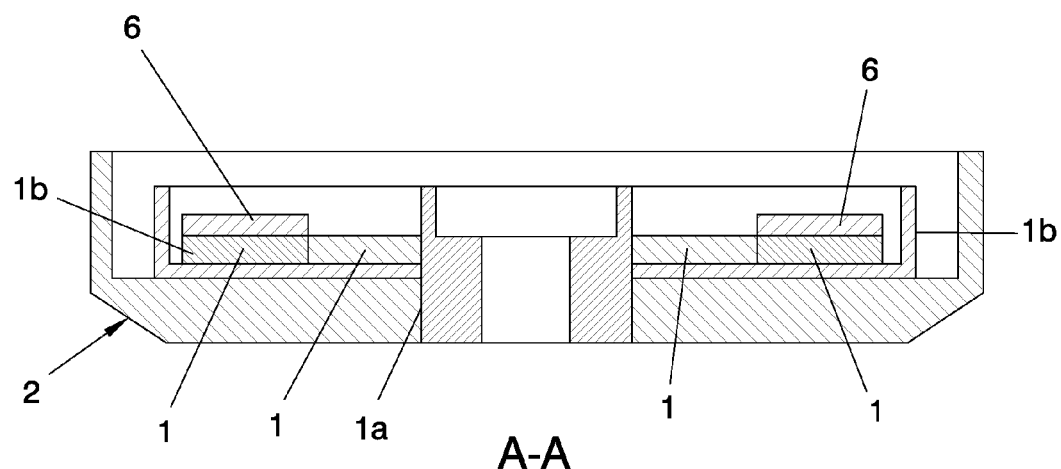
FIG. 9 is a section view through the line A-A shown in FIG. 4.
Figure 10:
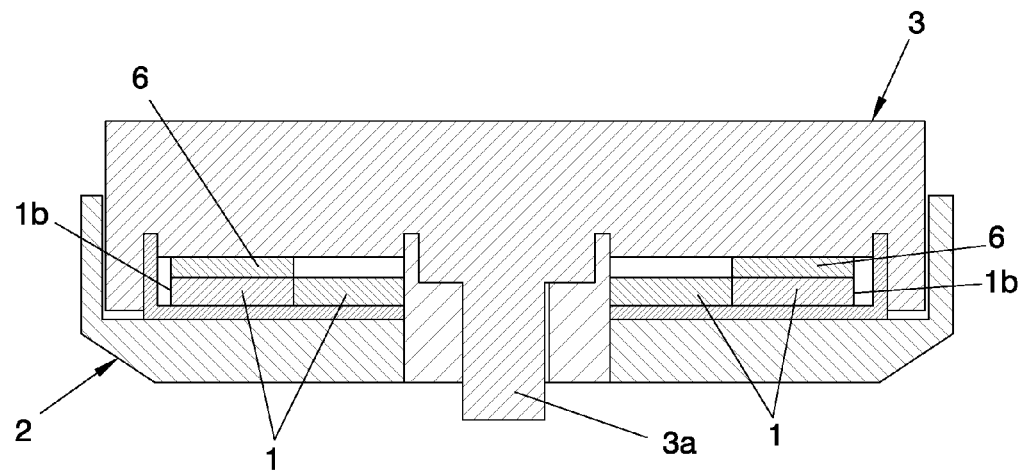
FIG. 10 is a section view of the chuck of FIG. 8 assembled in the base with the hydrostatic track of FIG. 9, in a resting position of the vertical lathe.
Figure 11:
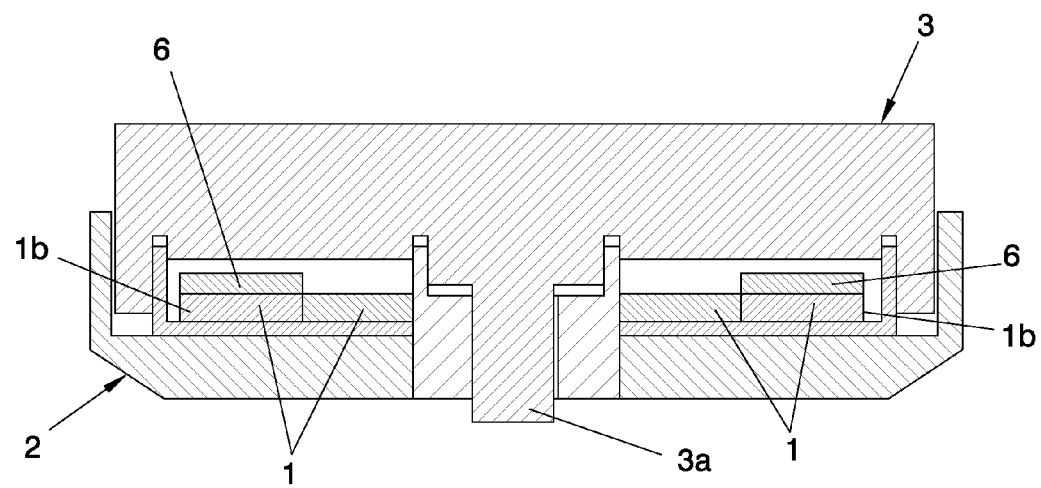
FIG. 11 is a section view of the chuck of FIG. 8 assembled in the base with the hydrostatic track of FIG. 9, in a rotation position of the vertical lathe.
Figure 12:
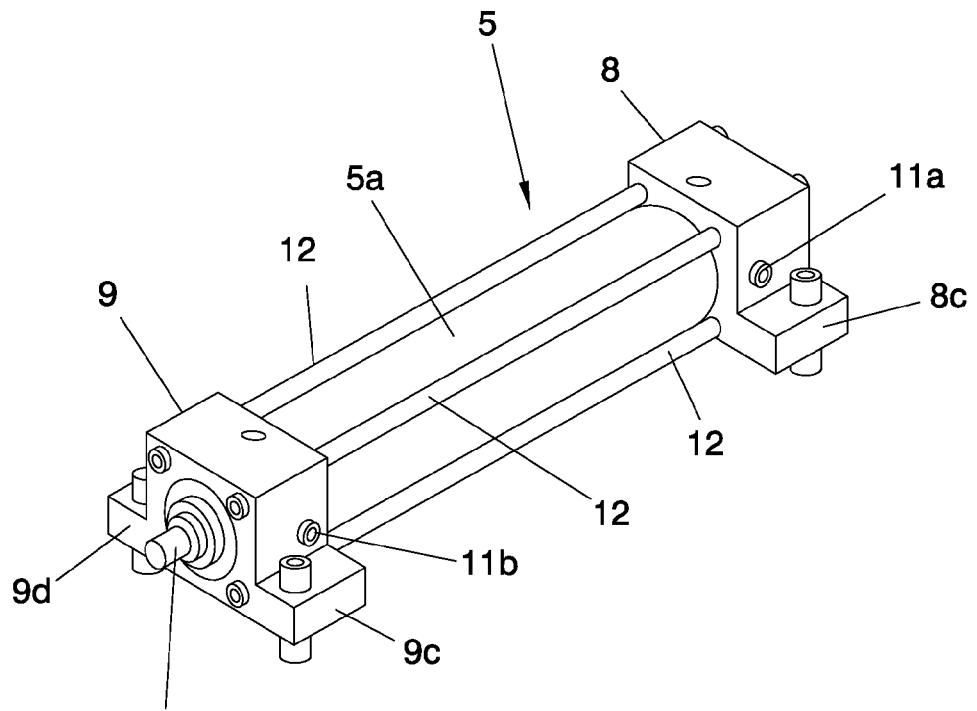
FIG. 12 is a perspective view of an embodiment of an actuating cylinder or the hydrostatic track of the present invention.
Figure 13:
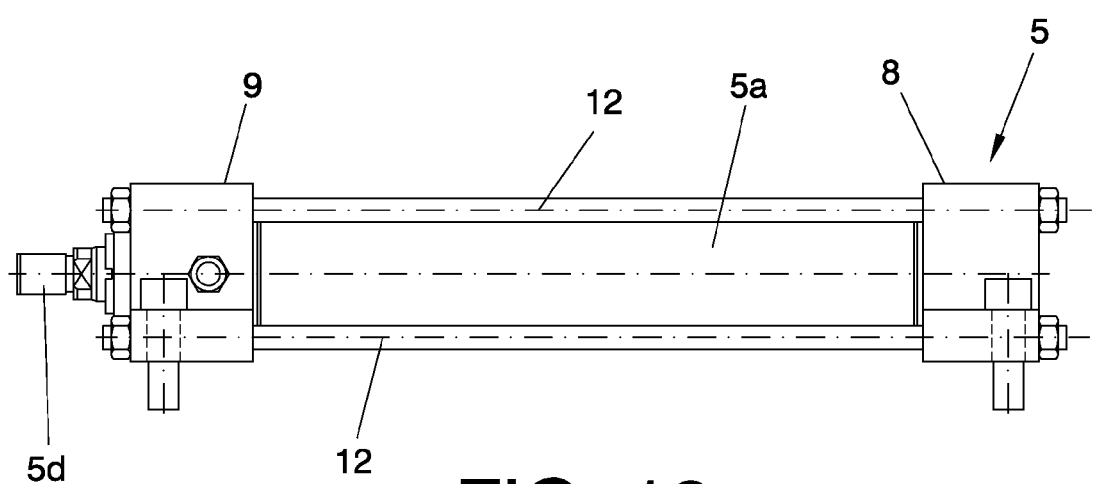
FIG. 13 is a side view of the actuating cylinder shown in FIG. 11.
Figure 14:
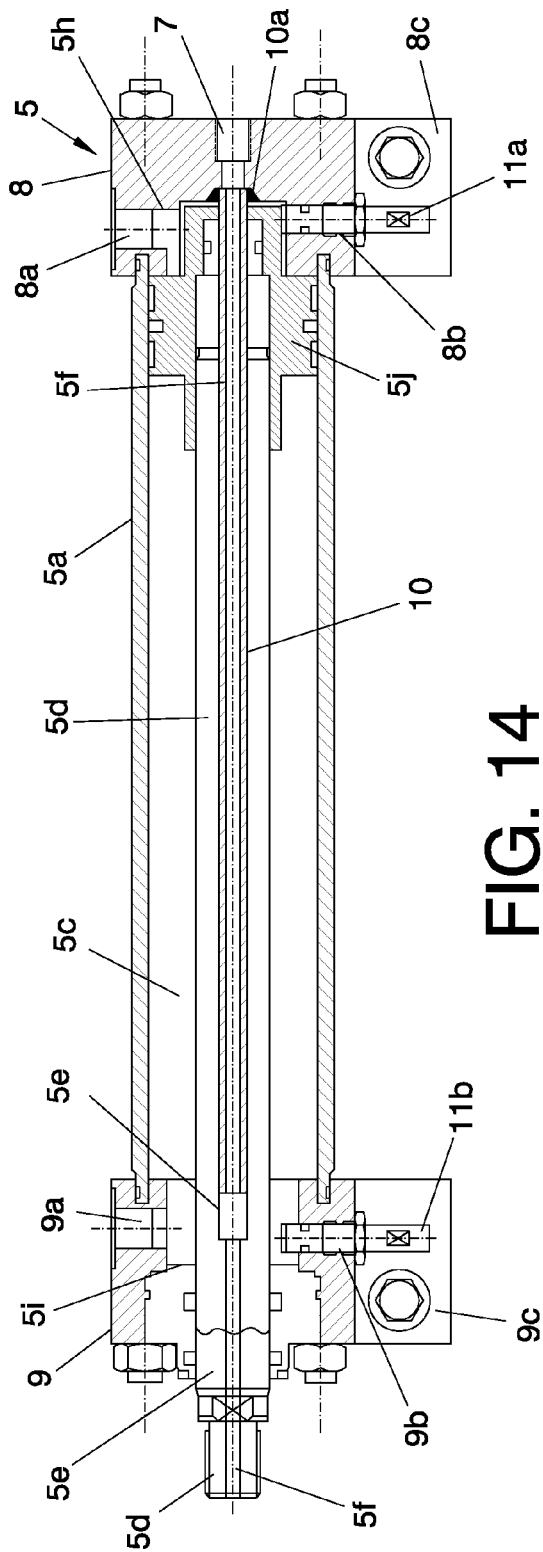
FIG. 14 is an upper longitudinal section view of the actuating cylinder shown in FIG. 11.
Figure 16:
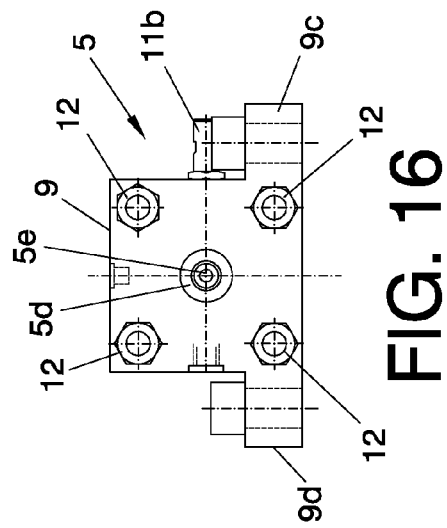
FIG. 16 is a front view of the actuating cylinder shown in FIG. 11.
Figure 15:
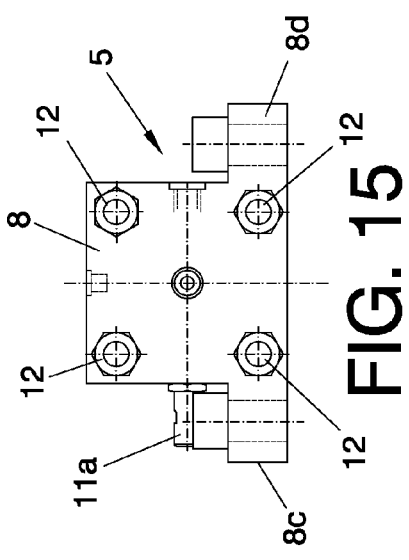
FIG. 15 is a rear view of the actuating cylinder shown in FIG. 11.

The sectors -4- are guided by the guidance blocks -6- such that, due to the action of the respective hydraulic cylinders, each sector is movable between an outer radial position in which the rod -5a- of the corresponding hydraulic cylinder -5- is locked in its extended position (see FIGS. 1, 4 and 7), an intermediate position in which the rod -5a- of the corresponding hydraulic cylinder -5- is locked in an intermediate extension position (see FIGS. 2, 5 and 7) and an inner radial position in which the rod -5d- of the corresponding hydraulic cylinder -5- is locked in its retracted position (see FIGS. 3, 6 and 7).

It is thus possible to position the sectors -4- so that they form respective circumferences with a maximum diameter (see FIGS. 1 and 4), a minimum diameter (see FIGS. 2 and 5), an intermediate diameter (see FIGS. 3 and 6), or circumferences in which the adjacent sectors -4- are in alternating positions such that some form a circumference of a minimum diameter and others form a circumference of an intermediate diameter (see FIG. 7) or other combinations (not illustrated in the figures).

FIGS. 8 to 16 show an embodiment of a hydraulic cylinder -5- which can integrated in the system according to the present invention. The hydraulic cylinder -5- conventionally comprises a barrel cylinder -5a-, a bottom chamber -5b-, a head chamber -5c- and a rod -5d- coupled at one of its ends to a piston -5j- moving linearly inside the barrel cylinder -5a-, and at the other end to one of the sectors -4-.

The hydraulic cylinder -5- is fixed to the annular base -1- at one of its ends by means of a first anchor body -8- anchored to the annular base -1- in the proximity of the central opening -1a-, and at its opposite end, through which the rod -5d- projects, by means of a second anchor body -9-. The intake connection -7- for the hydraulic fluid which is injected into the housing -4a- of the sector -4- is comprised in the first anchor body -6-. In an inner passage -5e- of the rod -5d- there is housed an inner tube -10- which traverses the piston -5j- and is fixedly connected at one of its ends to the intake connection -7- for the hydraulic fluid such that when the rod -5d- is extended and retracted, the wall of the inner passage -5e- of the rod -5d- slides in the periphery of the inner tube -10-. The inner tube -10- has a length such that the hydraulic fluid flows into the inner passage -5e- both when the rod -5d- is in its maximum extension position and when the rod -5d- is in its maximum retraction position. The anchor bodies -8, 9- are respectively provided with two side flanges -8c, 8d, 9c, 9d- capable of being screwed to the annular base -1- and attached to one another by means of four connection bars -12- coaxially surrounding the barrel cylinder -5a-.

The first anchor body -8- further comprises a first conduit -8a- connecting the bottom chamber -5b- of the hydraulic cylinder -5- with a first connection to a hydraulic feed circuit (not shown in the figures) whereas the second anchor body -9- comprises a second conduit -9a- connecting the head chamber -5c- of the hydraulic cylinder -5- with a second connection of this hydraulic circuit. The bottom -5h- of the hydraulic cylinder -5- is integrated in the first anchor body -8- and the head -5i- thereof in the second anchor body -9-. The first anchor body -8- further comprises a through hole -8b- in which there is housed a first pressure sensor -11a- measuring the pressure of the hydraulic fluid in the bottom chamber -5b- of the hydraulic cylinder -5-, and the second anchor body -8- in turn comprises a through hole -9b- for housing a pressure sensor -11b- measuring the pressure of oil in the head chamber -5c-.

Figure 17:
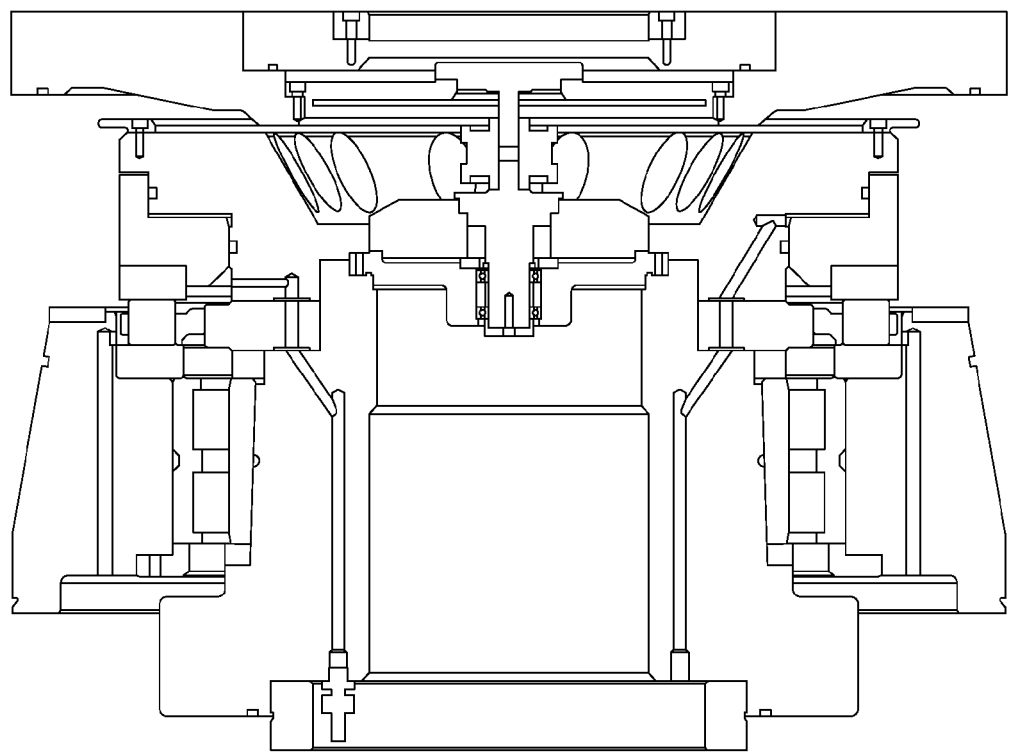
FIG. 17 is a partially sectioned side view of an embodiment of a hydraulic preloading system applicable to vertical lathes with hydrostatic tracks and can be incorporated in the embodiments of the invention shown in the previous figures.

FIG. 17 shows an embodiment of a variable preloading device of the hydrostatic track which comprises a central hydraulic cylinder by means of which the hydrostatic fluid can be preloaded according to the chosen configuration of the track, i.e., the position of the respective sectors.

The invention claimed is:

1. Variable hydrostatic track system for vertical lathes which comprises an annular base arranged between a support base and a securing rotating chuck of a vertical lathe, a central opening in the annular base which surrounds a rotation shaft of the rotating chuck; a plurality of sectors forming a circle and projecting vertically between a periphery of the annular base and the central opening of the annular base, each sector comprising an upwardly open upper housing;
   at least one hydraulic fluid outlet arranged at the bottom of each housing and which allows injecting hydraulic fluid into the corresponding housing such that, when the injected hydraulic fluid overflows from the housings, the hydraulic fluid pushes the rotating chuck upwards, forming a film of hydraulic fluid between the rotating chuck and the sectors; and
   further comprising a positioning mechanism capable of positioning the sectors at least in an inner radial position in which at least one part of the sectors is arranged at a circumference of a minimum diameter and in an outer radial position in which at least one part of the sectors is arranged at a circumference of a maximum diameter.

2. System according to claim 1, wherein the positioning mechanism is designed to position at least one part of the sectors at least in an intermediate position between said inner radial position and said outer radial position.

3. System according to claim 1, wherein the positioning mechanism is designed to individually position each sector in one of said positions.

4. System according to claim 1 wherein the positioning mechanism comprises a plurality of double-acting hydraulic cylinders fixed on the annular base in a radial direction between the central opening and the sectors, each hydraulic cylinder comprising a barrel cylinder, a bottom chamber, a head chamber, and a rod coupled at an end to a piston moving linearly in the barrel cylinder, and at another end to one of the sectors; each sector coupled to a hydraulic cylinder is guided at least in a radial guidance element such that, due to the action of the hydraulic cylinder, the sector is movable between the inner radial position in which the hydraulic cylinder is locked in its retracted position and the outer radial position in which the hydraulic cylinder is locked in its extended position.

5. System according to claim 4, wherein it comprises at least one pair of hydraulic cylinders fixed respectively in radially opposite directions in a diagonal line of the annular base which are coupled to both respective diagonally opposite sectors.

6. System according to claim 4, wherein each of the radial guidance elements is made up of a wedge-shaped block respectively projecting from the annular base between two adjacent sectors.

7. System according to claim 4, wherein the rod of each hydraulic cylinder comprises an inner passage with a first end part connected to an intake connection for the hydraulic fluid which is injected into the housing of the sector and a second end part connected to the hydraulic fluid outlet in the housing of the sector to which the hydraulic cylinder is connected.

8. System according to claim 7, wherein
   a first end of the hydraulic cylinder is fixed in the annular base by means of a first anchor body anchored to the annular base in the proximity of the central opening and a second end of the hydraulic cylinder, through which the rod projects, is fixed in the annular base by means of a second anchor body;
   the intake connection for hydraulic fluid which is injected into the housing of the sector is comprised in the first anchor body;
   in the inner passage of the rod of the hydraulic cylinder there is housed an inner tube which traverses the piston and is fixedly connected at one of its ends to the intake connection for the hydraulic fluid such that, when the rod is extended and retracted, the wall of the inner passage of the rod and the piston slide on said inner tube;
   the inner tube has a length such that the hydraulic fluid flows into said inner passage both when the rod is in a maximum extension position and when the rod is in a maximum retraction position.

9. System according to claim 8, wherein the first anchor body comprises a first conduit connecting the bottom chamber of the hydraulic cylinder with a first connection to a hydraulic circuit feeding the hydraulic cylinder and the second anchor body comprises a second conduit connecting the head chamber of the hydraulic cylinder with a second connection of the hydraulic circuit.

10. System according to claim 8, wherein the hydraulic cylinder comprises a bottom integrated in the first anchor body and a head integrated in the second anchor body.

11. System according to claim 8, wherein the first anchor body comprises a through hole for housing a first pressure sensor for measuring the pressure of the hydraulic fluid in the bottom chamber.

12. System according to claim 8, wherein the second anchor body comprises a through hole for housing a pressure sensor for measuring the pressure of oil in the head chamber.

13. System according to claim 8, wherein
   the first anchor body and the second anchor body are attached to each other by means of four connection bars coaxially surrounding the barrel cylinder; and/or wherein the first anchor body and the second anchor body each comprise two side flanges screwed to the annular base.

14. System according to claim 1, wherein each of the hydraulic cylinders can be driven independently of the others; and/or wherein each hydraulic cylinder can be locked at least in an intermediate position between said retracted position and said extended position; and/or wherein the system comprises a variable preloading device comprising a central hydraulic cylinder.

15. Vertical lathe comprising a support base, a securing rotating chuck and a hydrostatic track on which the rotating chuck rotates, wherein it comprises a variable hydrostatic track system such as the one defined in one of the previous claims.

* * * * *